UNITED STATES PATENT OFFICE.

HERMANN KOLBE, OF LEIPSIC, SAXONY.

IMPROVEMENT IN THE PROCESSES OF PREPARING SALICYLIC AND OTHER ACIDS.

Specification forming part of Letters Patent No. 150,867, dated May 12, 1874; application filed April 20, 1874.

*To all whom it may concern:*

Be it known that I, Professor Dr. HERMANN KOLBE, of Leipsic, in the Kingdom of Saxony, have invented an Improvement in the artificial production of Salicylic Acid, as well as the isomeric and homologous acids, by the action of carbonic acid on carbolic acid, on cressolic acids, or on a mixture of them, in presence of alkalies and alkaline earths, of which the following is a specification:

Among the acids of the aromatic range, the inventor, Professor Dr. KOLBE, originally produced and exhibited salicylic acid, ($C_7H_6O_3$,) synthetically, by means of introducing carbonic acid into boiling carbolic acid, ($C_6H_6O$,) while sodium (Na) was simultaneously dissolved in the latter. Yet this method, as well as the other, for the preparation of salicylic acid, produced with the aid of the expensive and not easily procurable (in quantities) winter-green oil ($C_8H_8O_3$) from *Gaultheria procumbens*, did not appear qualified to give a realization worth naming and advantageous.

The inventor's further labors in this direction finally led to results which permitted him in the highest degree to expect that the salicylic acid, with its isomeric and homologous compounds, produced on a large scale, is destined to occupy a prominent part in chemical technics.

After a number of modifications and improvements, the inventor has now fixed upon a definite mode of operation in the production of the above-mentioned acids. He has discovered that salicylic acid, and other acids of the aromatic series analogously producible, can be obtained by the action of carbonic acid on carbolic acid, cressolic acids, or a mixture of them, in presence of alkalies or alkaline earths, or a mixture of them, and this in large quantities, and at considerable reduction in the cost of production as compared with the methods now in use.

If hydrated oxide of potassium (KOH) be employed, the result will be principally paraoxybenzoic acid, or one of the homologous acids. On the other hand, if the hydrated oxides of sodium, (NaOHr,) calcium, ($CaO_2H_2$,) barium, ($BaO_2H_2$,) or strontium ($SrO_2H_2$) be used salicylic acid, or one of the homologous compounds, is produced.

The modes of performance are the following:

First method: Carbolic acid is heated with the solid hydrates of alkalies or alkaline earths, as hydrated oxide of potassium, sodium, calcium, barium, or strontium, in a closed retort of iron, glass, or any suitable substance. The temperature having for some time remained at 183° centigrade, or thereabout, and all the water, with a great part of the excess of used carbolic acid, having passed over into suitable vessels for its reception, so that the carbolic acid may be used again, dry carbonic acid being conducted in a continuous stream into the contents of the retort, the formation of salicylic acid or paraoxybenzoic acid, as the case may be, will take place without hinderance. The temperature may finally exceed 200° centigrade. Gradually the entire mass will become firm, and the operation comes to the close, when but little carbolic acid remains distilling over.

Second method—differing from the first in manipulation, but not in principle: In the first instance, a combination of the alkalies or alkaline earths, or of a mixture of them, with carbolic acid, is effected in a vessel over a slow fire, the quantities being calculated according to equivalents, or otherwise, as may be found convenient, heating, and at the same time continually agitating, until the substance is entirely divested of water and ready for further manipulation. This substance, dephlegmated as much as possible, is now brought into the retort and treated, as before described, by heating in a current of dry carbonic acid. By this means the corresponding salts of salicylic acid or paraoxybenzoic acid, or a mixture of them, are formed, while regenerated carbolic acid passes over and is collected for further use. In both cases, the process being completed, the contents of the retort are subjected to ablution with water, and the salicylic or paraoxybenzoic acid, or a mixture of both, as the case may be, is precipitated by hydrochloric or any other suitable acid. The production of the acids homologous to the salicylic or paraoxybenzoic acids is obtained by the same procedure, but with the employment of cressolic acids in the place of carbolic acid. By using a mixture of carbolic and cressolic acids, a mixture of the above-named products will be obtained.

The appropriate apparatus for the production of the above substances naturally results from the above description. The utensils of chemical laboratories, as evaporating-vessels, bray-mortars, vertical or horizontal retorts, crystallizing-pans, &c., may also be used.

The employment of agitating contrivances is not peremptory, but must be considered desirable for the more rapid development of the process.

I claim—

The artificial production of salicylic acid, as well as the isomeric and homologous acids, by the action of carbonic acid on carbolic acid, on cressolic acids, or on a mixture of them, in presence of alkalies and alkaline earths.

DR. HERMANN KOLBE.

Witnesses:
    Dr. ERNST VON MEYER,
    Dr. ANTON WEDDIGE.